United States Patent [19]

Tonomura

[11] Patent Number: 5,037,025
[45] Date of Patent: Aug. 6, 1991

[54] WATER DROPLET FREE CUPS AND METHOD OF FABRICATING SAME

[76] Inventor: Kojhi Tonomura, 27-5, Kakinokizaka 1-chome, Meguro-ku, Tokyo, Japan

[21] Appl. No.: 321,940

[22] Filed: Mar. 10, 1989

[30] Foreign Application Priority Data

Oct. 14, 1988 [JP] Japan ................................ 63-257107

[51] Int. Cl.⁵ .............................................. B65O 3/26
[52] U.S. Cl. ................................ 229/1.5 B; 215/100.5
[58] Field of Search .................... 229/1.5 B; 215/100.5

[56] References Cited

U.S. PATENT DOCUMENTS

| | | | |
|---|---|---|---|
| 1,917,953 | 7/1933 | Davis | 215/100.5 |
| 1,924,926 | 8/1933 | Gray | 215/100.5 |
| 2,345,784 | 4/1944 | Wolcott | 215/100.5 |
| 2,541,581 | 2/1951 | Gruber | 215/100.5 |
| 2,568,623 | 9/1951 | Hamm | 215/100.5 |
| 2,608,074 | 8/1952 | Davis | 215/100.5 |
| 2,612,031 | 9/1952 | Cockrid | 215/100.5 |
| 2,655,281 | 10/1953 | Davis | 215/100.5 |
| 2,672,250 | 3/1954 | Haslett | 215/100.5 |
| 3,013,689 | 12/1961 | Shropshire | 215/100.5 |
| 3,018,014 | 1/1962 | Opolion | 215/100.5 |
| 3,203,611 | 8/1965 | Anderson et al. | 229/1.5 B |
| 4,340,146 | 7/1982 | Stratton | 215/100.5 |

FOREIGN PATENT DOCUMENTS

84241 7/1981 Japan ................................ 229/1.5 B

*Primary Examiner*—Gary E. Elkins
*Attorney, Agent, or Firm*—Dykema Gossett

[57] ABSTRACT

A cup comprising a cup body of synthetic resin and a water absorptive paper integrally attached around the lower portion of the outer surface of the cup body.

6 Claims, 3 Drawing Sheets

WATER DROPLET FREE CUPS AND METHOD OF FABRICATING SAME

BACKGROUND OF THE INVENTION

1. Technical Field

The present invention relates to a cup on which water droplets adhering upon dew condensation do not reach a table or a saucer upon which the cup stands, and a method of fabricating such a cup.

2. Background Art

In general, when cool liquid is poured into a cup, water droplets appear on the outer periphery of the cup since water vapor in the atmosphere near the cup condenses. Upon such condensation, the water droplets start falling down along the outer periphery of the cup. These waterdrops sometimes wet the clothing of the person holding the cup. Heretobefore, a shallow plate or coaster has been placed under the cup to absorb the water drops, or a table napkin has been put around the cup for the same reason.

However, it is troublesome to prepare a table napkin or a coaster each time the drink is served. Also, it is inconvenient to carry the cup together with a table napkin or the like. In addition, it is not practical to provide an automatic vending machine which dispenses liquid and a cup made of paper or synthetic resin with coasters or mats.

SUMMARY OF THE INVENTION

One object of the present invention is to provide a water droplet free cup which eliminates the above mentioned shortcomings by preventing water droplets adhering on the outer periphery of the cup from reaching its bottom or the place where it stands so that mats, coasters or table napkins are not required.

Another object of the present invention is to provide a water droplet free cup which is suited for vending machines, and easy to carry in one's hand.

According to one aspect of the present invention, there is provided a water droplet free cup which is provided with a water absorbing member around the outer periphery of a cup at lower portion thereof.

According to such a cup, as waterdrops adhering on the outer face of the cup move downward along the cup surface, they are absorbed by a water absorbing member before reaching the cup's bottom. Therefore, waterdrops never get to the bottom of the cup. Accordingly, mats or table napkins are not necessary for the cup. The water absorbing member does not affect the handiness of the cup. Since the water absorbing member is attached to only a part of the cup's outer surface, friction between the cups is small when one of a plurality of the cups stacked, for example, in a vending machine is to be dispensed. Hence, the outermost portion of the water absorbing member of one cup does not adhere on the inner surface of the other cup, and thus there are no problems in dispensing the cups.

According to another aspect of the present invention, there is provided a method of fabricating the above-described novel cups, which comprises the steps of:

(A) setting a sheet of synthetic resin, which has been heat-treated beforehand, between a male mold for fabricating an inner face of a cup and a female mold for an outer face thereof;

(B) engaging the male with the female molds to thereby sandwich the synthetic resin sheet, so as to fabricate a cup of synthetic resin; and, (C) setting a water absorbing member along an inner loser periphery of the female mold before step (A), in a manner such that the water absorbing member is integrally attached to the cup body of synthetic resin.

According to another aspect of the present invention, there is provided a cup which comprises a cup body made of paper processing relatively high water-absorbent property, and a waterproof layer such as paraffin to cover the entire inner and outer surfaces of the cup body except the lower part of the outer surface thereof. This cup can also absorb a waterdrop falling along the outer periphery of the cup since the uncovered portion of the cup body functions as the water absorbing member.

A method of fabricating the cup last mentioned above comprises the steps of:

fabricating a cup body made of relatively high water-absorbent material;

covering the lower portion of the outer periphery of the cup body with a masking material of predetermined width;

forming a waterproof layer on the entire inner and outer surface of the cup body; and removing the masking material from the cup body.

These and other objects, aspects and advantages of the present invention will be more fully understood by reference to the following detailed description taken in conjunction with the various figures and appended claims.

BRIEF DESCRIPTION OF THE DRAWINGS

The accompanying drawings form an integral part of the description of the preferred embodiment and are to be read in conjunction therewith, wherein.

DESCRIPTION OF THE PREFERRED EMBODIMENTS

Preferred embodiments of the present invention will now be described with reference to the accompanying drawings.

Figure 1:
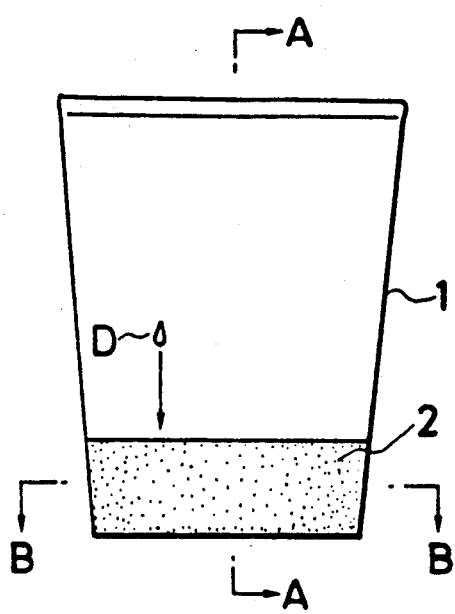
FIG. 1 is a side view showing a water droplet free cup according to the present invention.
Figure 3:
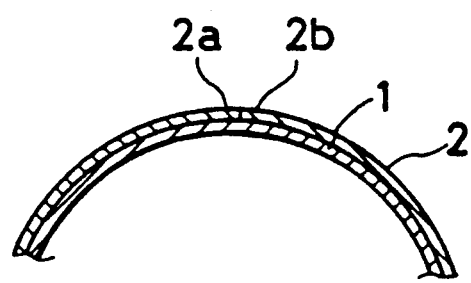
FIG. 3 is a partial sectional view taken along the line B—B of FIG. 1.
Figure 2:
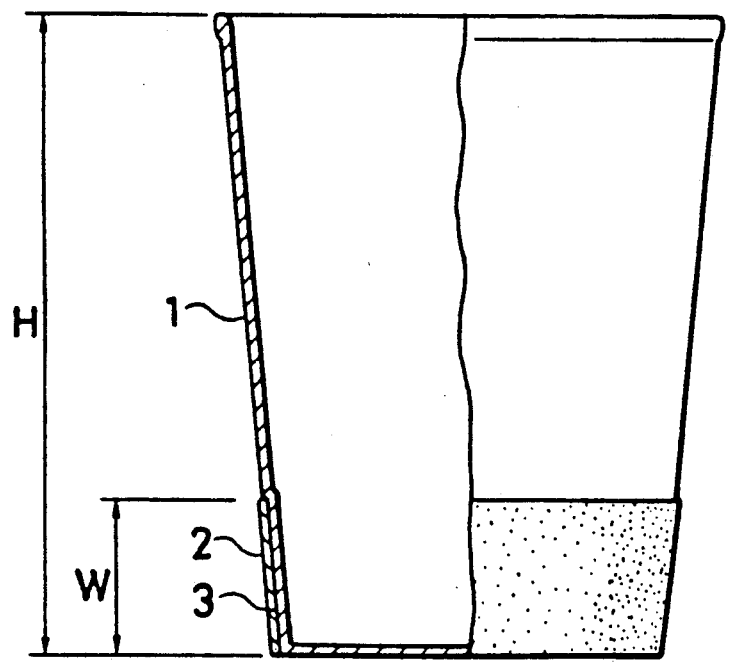
FIG. 2 is a sectional view taken along the line A—A of FIG. 1.

In FIGS. 1 through 3, reference numeral 1 designates a cup body. A water absorbing member 2 is provided around the lower, outer surface of the cup body 1. The water absorbing member 3 is made of non woven fabric, blotting paper, or the like.

Figure 4:
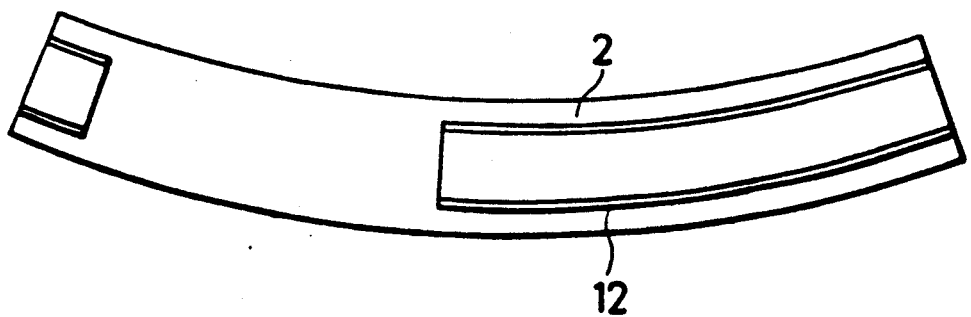
FIG. 4 is a expanded view of a water absorbing material.

The water absorbing member 3 is shaped like a bank as illustrated in FIG. 4, and wound around the outer periphery of the cup body 1 with both ends 2a and 2b being joined to each other like a ring as shown in FIG. 3. The water absorbing member 2 is attached to the outer periphery of the cup body in a manner such that the outer surface of the water absorbing member 2 is level to and continuous to the uncovered outer surface of the cup body 1. In other words, that part 3 of the cup body 1 which the water absorbing member 2 is to be attached is hallowed recessed by an amount equal to the thickness of the water absorbing member 2. The width W of the water absorbing material 2 is preferably about one-fifth of the height of the cup body 1.

As water droplets adhering on the cup outer surface moved downward, they are absorbed by the water absorbing material 2 due to capillary phenomenon. Therefore, those water droplets do not leave the cup, and hence the use of coasters, table napkins, or the like are not necessary. In this case, the handling qualities of the cup are not affected at all. Accordingly, such cups are well suited for use in vending machines which required cups that are simple in structure. When the cups are stacked up in the vending machine, the friction between each two adjacent stacked cups is small since the water absorbing material 2 is only provided to the lower part of the cup body and the surface of the water absorbing material 2 is level (co-planar) with that of the cup body. Thus, dispensation of the stacked cups is as smooth as ordinary cups. Moreover, hairs or fibers of the water absorbing material 2 do not remain on the inner surface of the engaged cup.

Figure 5:
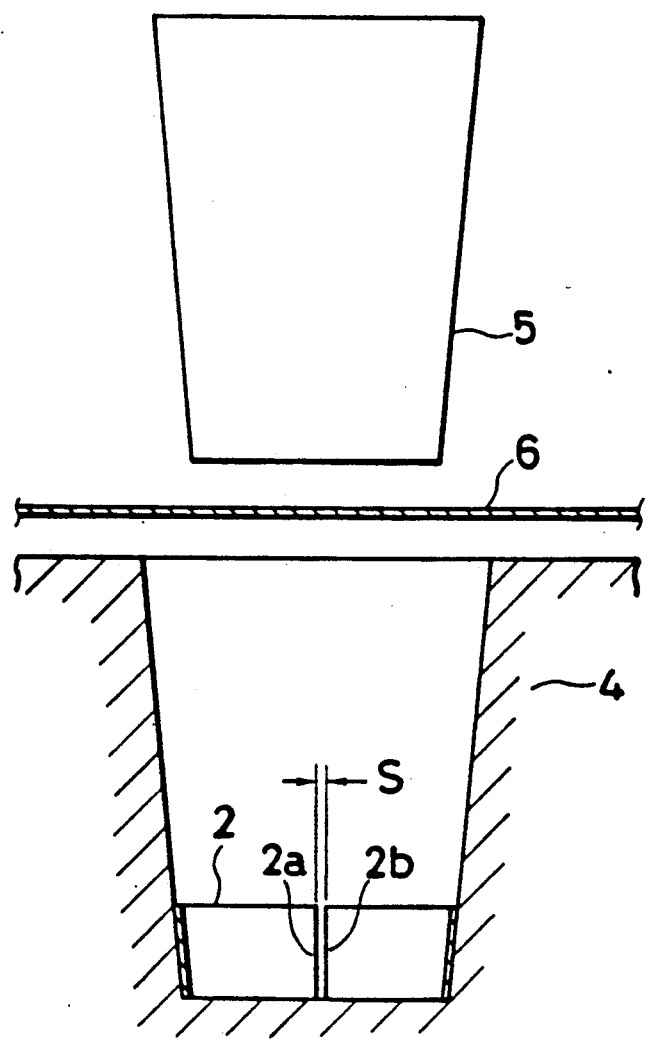
FIG. 5 is a view useful in explaining the process of fabricating a cup of the present invention.

The cup body 1 is fabricated using a press molding machine (not shown) which includes a female mold 4 for shaping the outer surface of the cup, a male mold 5 for shaping the inner surface of the cup and a press device (not shown) for engaging the female and the male molds with a sheet of synthetic resin 6 put between the two molds, as shown in FIG. 5. In this case, a water absorbing material 2 of ring shape has been disposed along the lower portion of the female mold 4 before the sheet 6 is pressed by the male and female molds 4 and 5. Also, adhesive has been applied to the inner surface of the water absorbing material 2 beforehand. Thus, in this manner a cup of synthetic resin which is provided with the water absorbing material 2 around its body 1 can be made. Here it should be noted that the ring of the water absorbing material 2 possesses a clearance S to accommodate shrinkage of the synthetic resin cup due to cooling after the pressing process. If there is not provided any clearance, the ends 2a and 2b of the water absorbing member 2 would otherwise overlap. Preferably, the inside of the female mold 4 is under a vacuum in order to prevent the liquid absorbing member 2 from moving during the pressing process. Further, the male mold 5 may be replaced by compressed air, i.e., the cup may be fabricated by way of blow molding.

Figure 6:
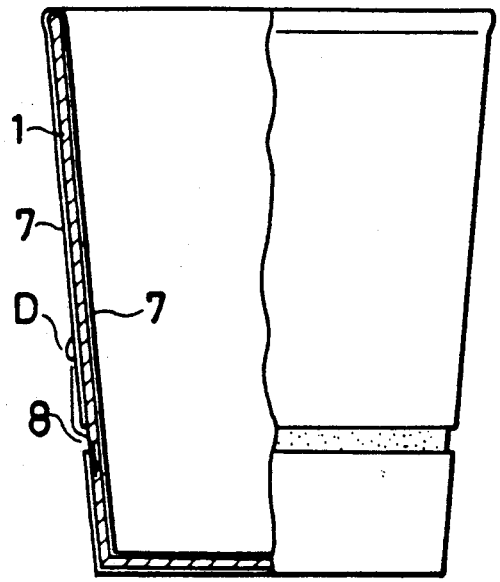
FIG. 6 is a sectional view showing a water droplet free cup whose outer surface includes a partially uncovered waterproof layer.

FIG. 6 depicts another embodiment of the present invention. The cup body 1 is made of paper or the like which has relatively high water absorbing properties. The entire inner surface and most of the outer surface of the cup body 1 are coated with a waterproof layer 7 such as paraffin. The uncovered portion, or the exposed portion 8 is formed in the shape of a band or a ring along the outer surface of the cup body 1 at a position relatively near the bottom of the cup so that the water droplet D produced upon condensation may be absorbed by the exposed portion 8, which is made of paper having high water absorption properties, when the water falls along the outer surface of the cup. In this case, unlike the cup illustrated in the foregoing embodiment, the exposed portion 8, which serves as, the water absorbing material, is formed within a recess of the cup surface. Therefore, the water absorbing material at exposed portion 8 does not contact one's hand when the cup is grasped. In other words, the cup surface is kept pleasant to touch after the portion 8 has absorbed the liquid droplets.

Figure 7:
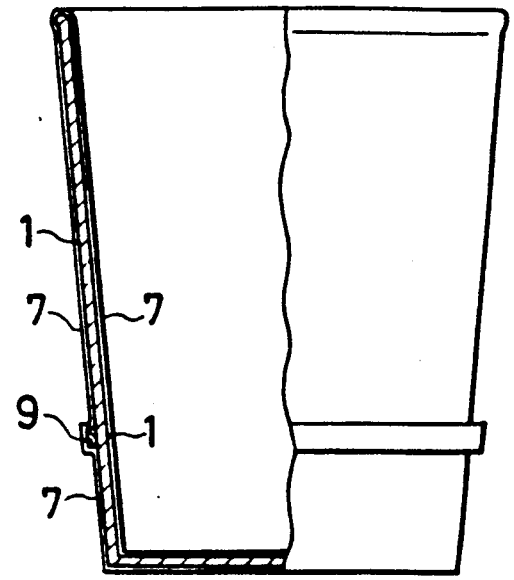
FIG. 7 is a view of fabrication of the cup of FIG. 6.

In fabricating the cup described just above, the cup body 1 is made using paper material of relatively high water absorbing property, and then as mask 9 of predetermined width is wound around the outer surface of the cup body 1 at a position relatively near the bottom of the cup body. After that, the cup body 1 is coated with the waterproof layer 7 such as paraffin, and the mask 9 is removed from the cup body 1, so as to expose the portion 8, as shown in FIG. 7. The cup body 1 may be printed with some color or pattern before it is covered with the waterproof layer 7. Also, a plurality of masks 9 may be attached on the outer surface of the cup body 1 so that plural exposed portions 9 of ring-shape are formed.

Figure 8:
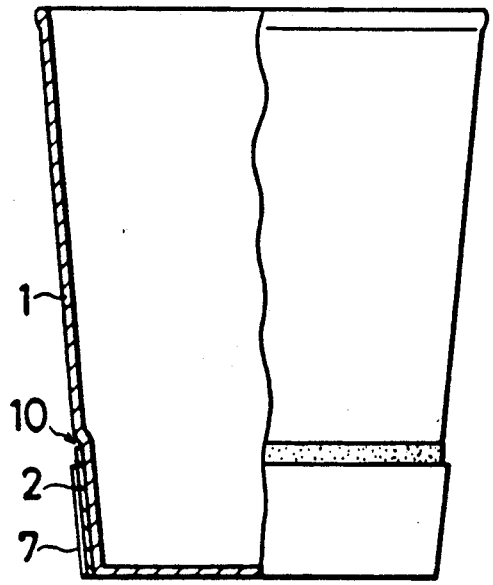
FIG. 8 is a sectional view illustrating a cup provided with a waterproof layer to cover a part of the uncovered portion.

FIG. 8 illustrates a modification of the cup of FIG. 1 or 2. The lower part of the cup body 1 is covered with the liquid absorbing material 2, and then the most of the liquid absorbing material 2 is covered with the waterproof layer 7. The liquid absorbing material 2 exposes upward from the upper end of the waterproof layer 7 by two or three mm, forming the exposed portion 10. The water droplets moving down along the outer surface of the cup body 1 are absorbed by the exposed portion 10 and contained in the liquid absorbing material 2.

In the case of this last embodiment, since the liquid absorbing material 2 is covered with the waterproof layer 7, the cup is maintained pleasant to the touch.

Figure 9:
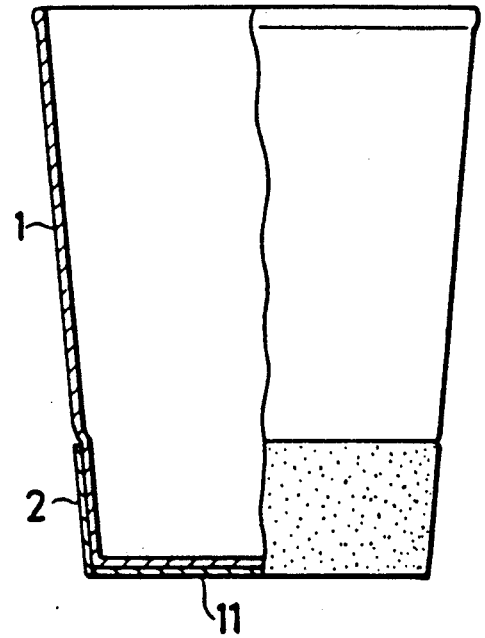
FIG. 9 is a sectional view of a cup whose bottom is also covered with a water absorbent material.

Another water absorbing material 11 may be attached to the bottom of the cup as illustrated in FIG. 9 in addition to the cup lower part covering material 2.

Graphic portion 12 (FIG. 4) such as letters or pattern may be printed on the water absorbing material 2.

What is claimed is:

1. A cup comprising a cup body having a lateral wall extending through a first distance from a bottom, and a water absorbing part attached to the cup body at an outer lower portion of the lateral wall of the cup body which extends through less than half of said first distance, a lower outer portion of the lateral wall being recessed to receive the water absorbing part such that when the water absorbing material is attached to the cup body, an outer surface of the water absorbing material is substantially coplanar with the upper outer portion of the cup body.

2. A cup according to claim 1, wherein the water absorbing material is made of water absorptive paper and has a ring shape.

3. A cup according to claim 1, wherein the water absorbing material is made of water absorptive paper and has a ring shape.

4. A cup according to claim 1, wherein the cup body is made of heat-treated synthetic resin.

5. A cup according to claim 2, wherein the cup body is made of heat-treated synthetic resin.

6. A cup according to claim 3, wherein the cup body is made of heat-treated synthetic resin.

* * * * *